March 12, 1963  J. J. SENDOYKAS  3,081,105
VELOCIPEDE CONVERTIBLE TO COASTER WAGON
Filed Oct. 19, 1960  6 Sheets-Sheet 1
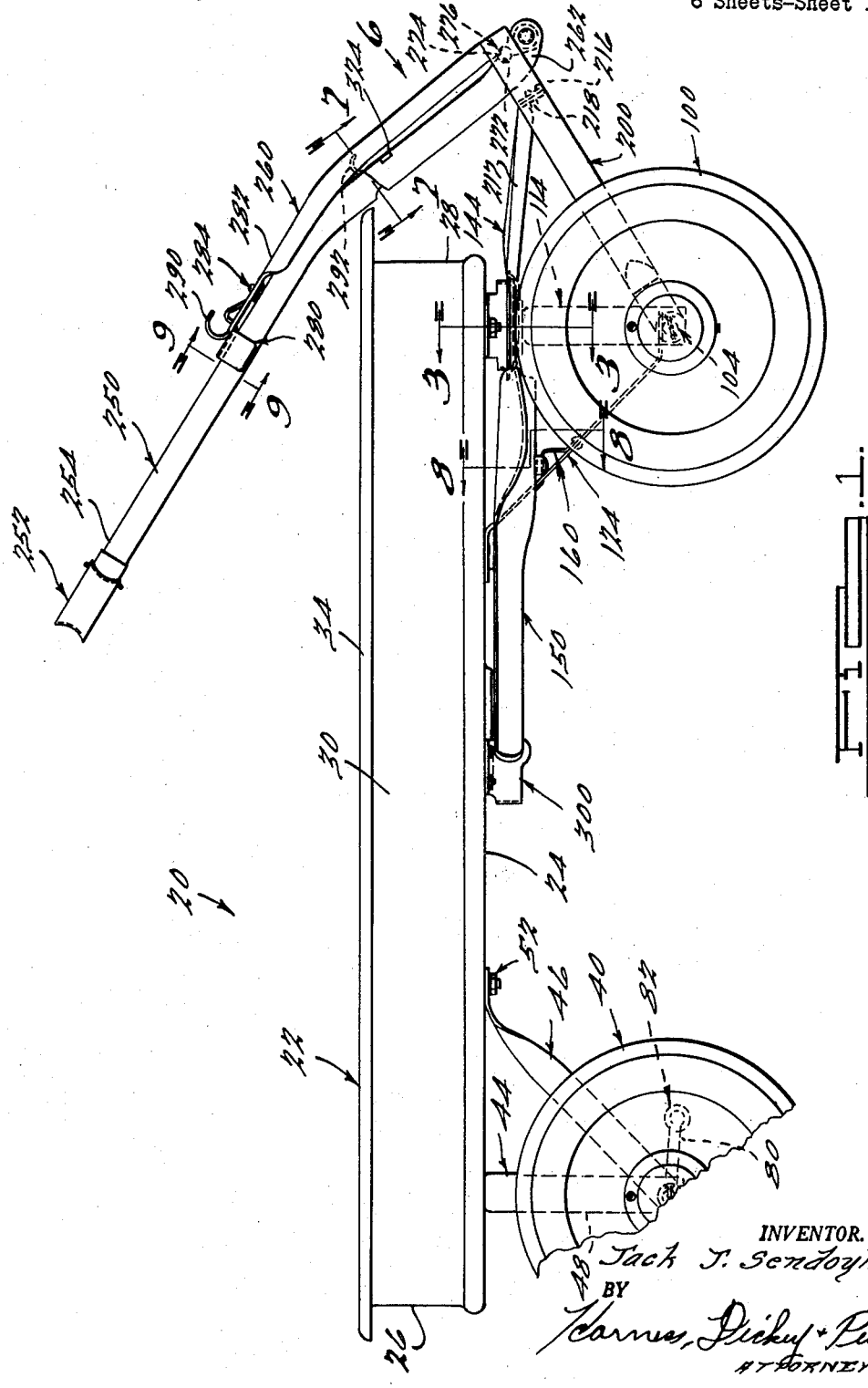
INVENTOR.
Jack J. Sendoykas.
BY
Carnes, Dickey & Pierce.
ATTORNEYS.

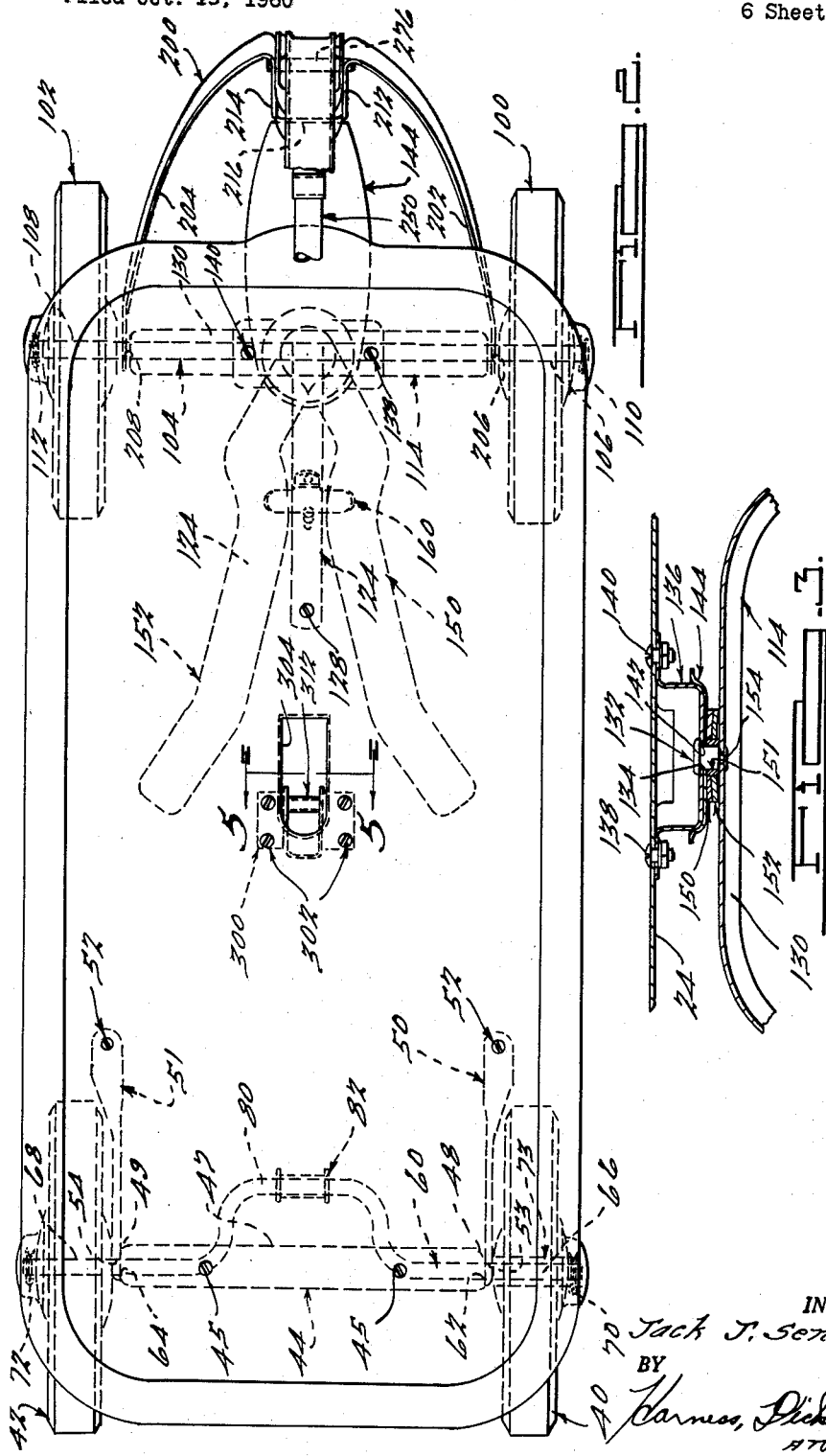

March 12, 1963 J. J. SENDOYKAS 3,081,105
VELOCIPEDE CONVERTIBLE TO COASTER WAGON
Filed Oct. 19, 1960 6 Sheets-Sheet 3
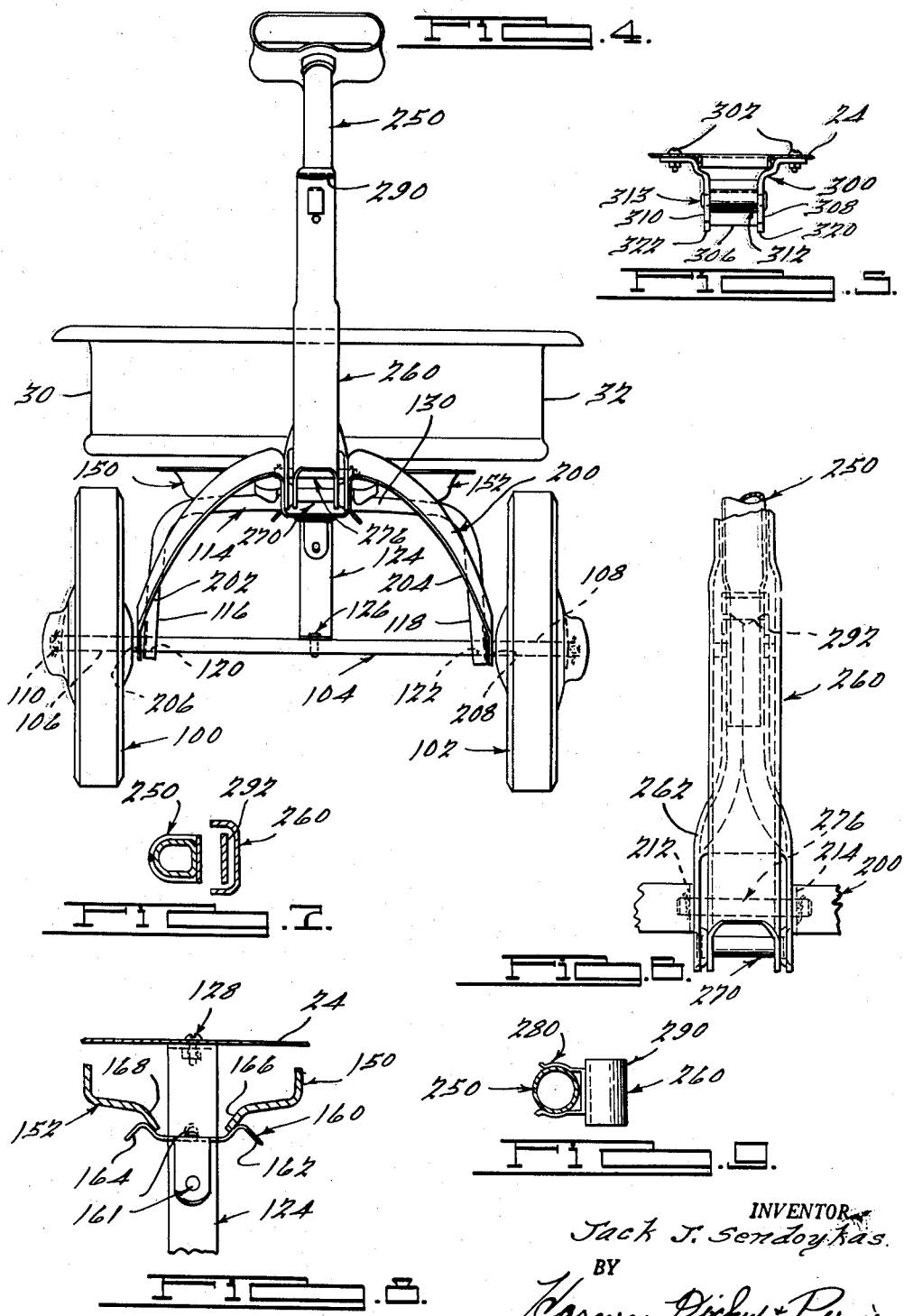
INVENTOR
Jack J. Sendoykas.
BY
Harness, Dickey & Pierce
ATTORNEYS

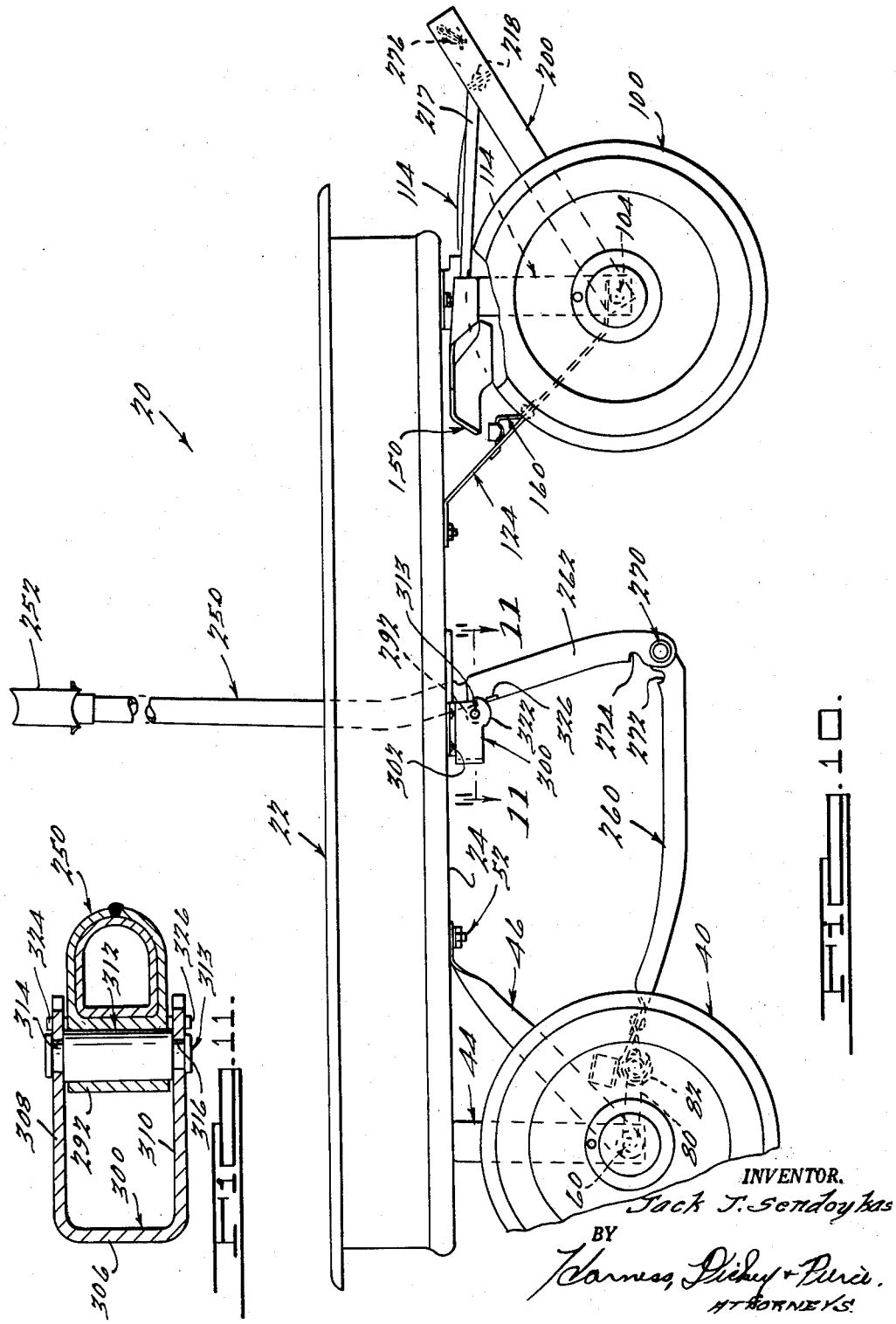

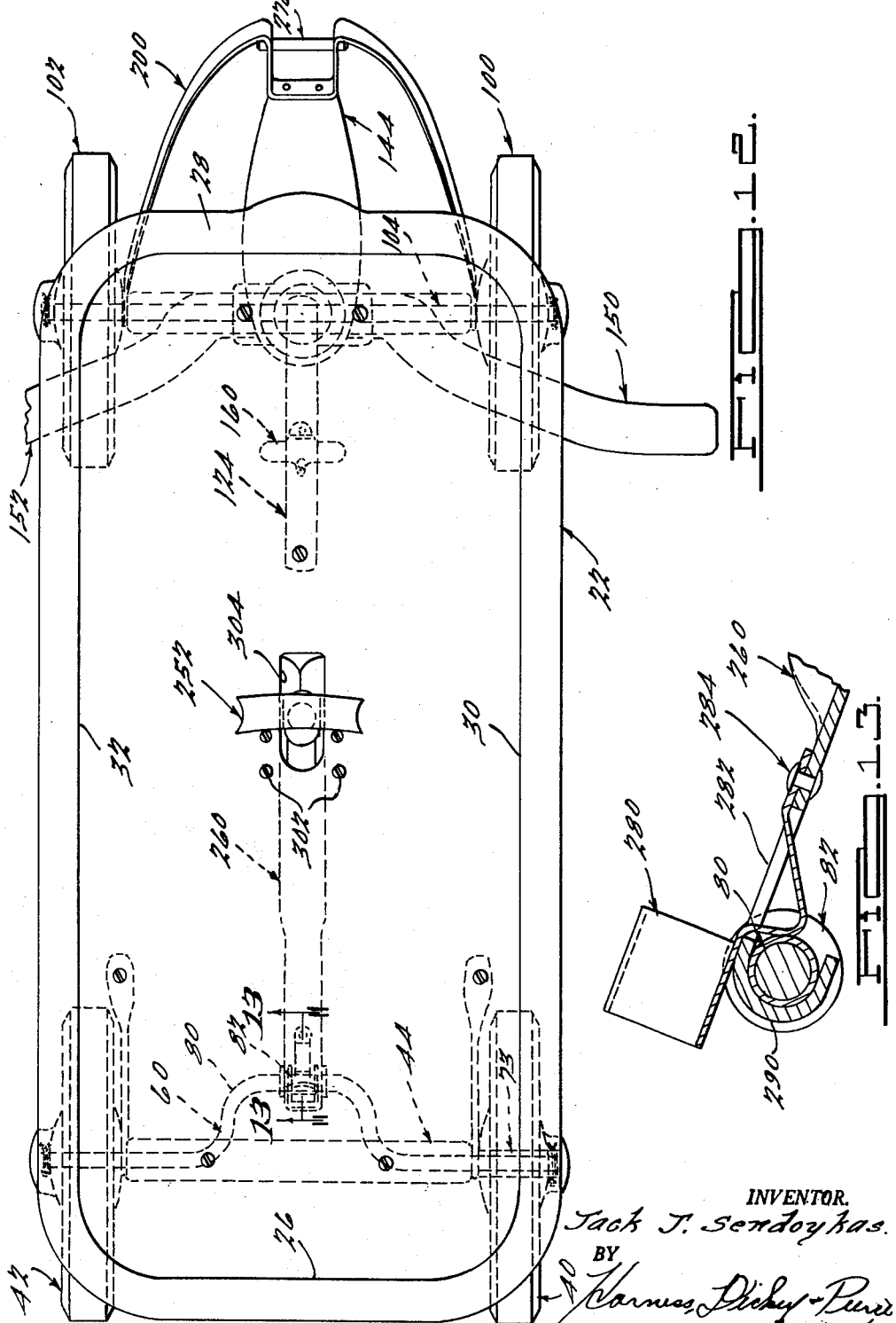

March 12, 1963   J. J. SENDOYKAS   3,081,105
VELOCIPEDE CONVERTIBLE TO COASTER WAGON
Filed Oct. 19, 1960   6 Sheets-Sheet 6
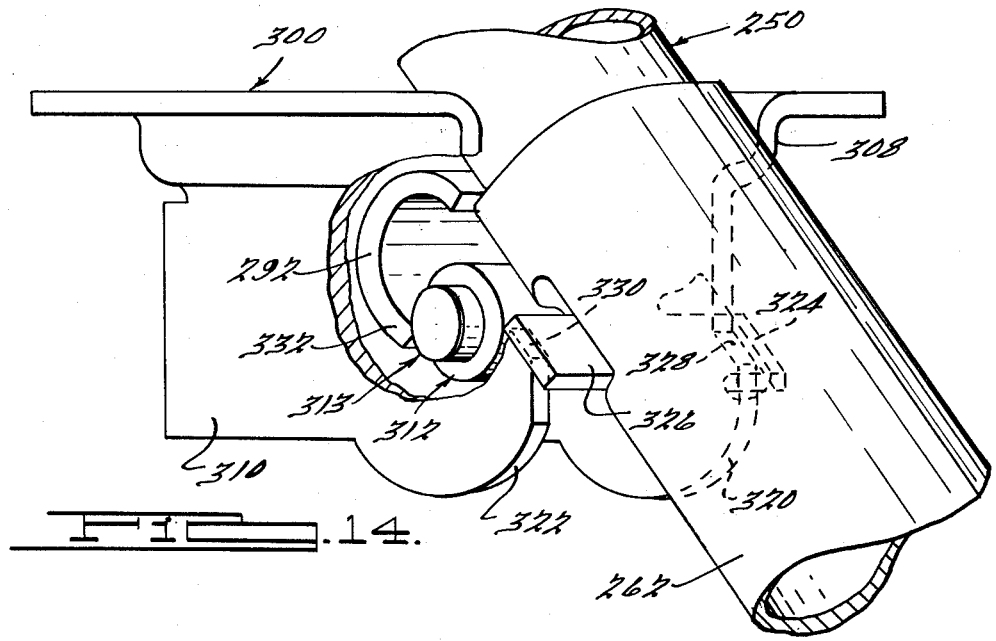
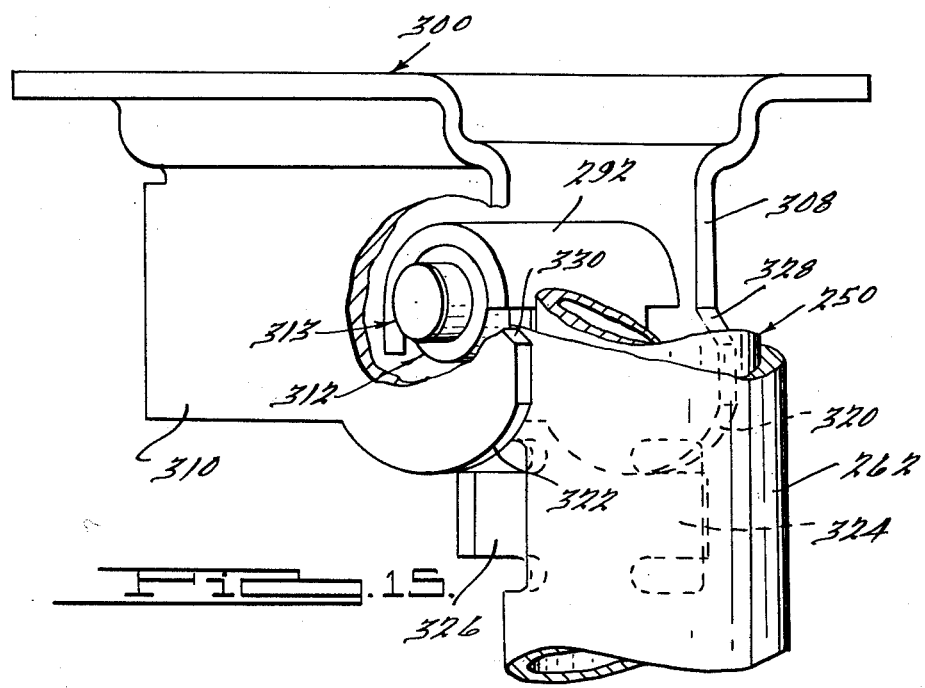
INVENTOR.
Jack J. Sendoykas
BY
Harness, Dickey & Pierce
ATTORNEYS United States Patent Office
3,081,105
Patented Mar. 12, 1963

3,081,105
VELOCIPEDE CONVERTIBLE TO COASTER WAGON
Jack J. Sendoykas, 32001 E. Jefferson Ave., Apt. 1, St. Clair Shores, Mich.
Filed Oct. 19, 1960, Ser. No. 63,657
3 Claims. (Cl. 280—7.17)

This invention relates generally to velocipedes and more particularly to a wagon that is convertible from a coaster wagon to a wagon that can be self-propelled.

Coaster wagons having provision for self-propulsion, sometimes termed "Irish Mails," are operable similarly to a handcar by, for example, a child sitting within the wagon. "Irish Mails" heretofore known and used characteristically have a dual purpose pumping and steering handle mounted outside the wagon at the forward end thereof. This location for the handle is desirable when the velocipede is used as a coaster wagon, but is relatively inconvenient for use as an "Irish Mail" in that it renders pumping difficult because the upper end of the handle reaches a point well forward of the wagon body on the forward stroke, at which position the occupant has relatively little leverage on the handle.

The present invention is directed to a convertible wagon having a dual function handle and associated assembly whereby the handle can be mounted in either of two positions to condition the wagon for use as a coaster wagon or as an improved, self-propelled "Irish Mail."

Accordingly, one object of the present invention is an improved convertible coaster wagon and "Irish Mail."

Another object is an improved velocipede having provision for an efficient means of self-propulsion.

Another object is to provide a wagon having a single handle that is positionable at the front of the wagon to facilitate use thereof as a coaster wagon and that is repositionable centrally of the wagon body to effect use of the wagon as an "Irish Mail."

Still another object of the invention is an "Irish Mail" wherein the rear wheels of the vehicle are propelled by a centrally disposed handle.

Still another object is to provide an improved body and frame structure for a four-wheeled velocipede.

A further object is to provide an improved self-propulsion system for a wagon including a handle adapted to serve in one condition as a pumping means for the propelling system and in another condition in the conventional manner for pulling or steering.

Another object is to provide a novel means for selectively coupling and uncoupling a handle of a convertible coaster wagon and "Irish Mail."

Other objects and advantages of the present invention will become apparent from the following specification, claims and drawings, wherein:

FIGURE 1 is a side elevational view of a velocipede in accordance with an exemplary embodiment of the present invention;

FIG. 2 is a top plan view of the velocipede of FIGURE 1;

FIG. 3 is a cross sectional view taken substantially along the line 3—3 of FIGURE 1;

FIG. 4 is a front plan view of the velocipede of FIGURE 1;

FIG. 5 is a cross sectional view taken substantially along the line 5—5 of FIG. 2;

FIG. 6 is a view taken in the direction of the arrow 6 of FIGURE 1;

FIG. 7 is a cross sectional view taken substantially along the line 7—7 of FIGURE 1;

FIG. 8 is a cross sectional view taken substantially along the line 8—8 of FIGURE 1;

FIG. 9 is a cross sectional view taken substantially along the line 9—9 of FIGURE 1;

FIG. 10 is a side elevational view of the velocipede assembled as an "Irish Mail" for self-propulsion;

FIG. 11 is a cross sectional view taken substantially along the line 11—11 of FIG. 10;

FIG. 12 is a top plan view of the velocipede assembled as an "Irish Mail" for self-propulsion;

FIG. 13 is a cross sectional view taken substantially along the line 13—13 of FIG. 12;

FIG. 14 is a fragmentary perspective view of the hanger and handle locking assembly prior to seating thereof; and FIG. 15 is a fragmentary perspective view similar to FIG. 14 showing the handle in the locked condition with respect to the hanger.

Referring now to FIGURE 1 of the drawings, a velocipede 20 in accordance with an exemplary embodiment of the present invention, comprises a one-piece upwardly skirted body or pan 22 formed of, for example, sheet metal as by conventional drawing operations. The body 22 has a substantially flat base portion 24 with upwardly extending front and rear walls 26 and 28 and side walls 30 and 32. The body 22 has a flanged and rounded upper edge portion 34 extending entirely around the periphery thereof to stiffen the body portion 22 and to provide a comfortable and safe upper edge surface.

A pair of rear wheels 40 and 42 (FIG. 2) are supported by an inverted generally U-shaped yoke 44 that is rigidly secured to the base 24 of the body 22 as by a pair of machine screws 45. The U-shaped configuration of the yoke 44 is defined by a transverse bight portion 47 having downwardly depending leg portions 48 and 49. A pair of supporting straps 50 and 51 are secured to the base 24 of the pan 22 as by a pair of bolts 52 and have apertures 53 and 54, respectively, at the other ends thereof for the acceptance of a transverse axle 60.

The axle 60 is journaled in suitable apertures 62 and 64 in the lower ends of the leg portions 48 and 49 of the yoke 44 and by the apertures 53 and 54 in the supporting straps 46 and 48, respectively. The wheels 40 and 42 are mounted on the outer end portions 66 and 68 of the axle 60 and are retained thereon as by conventional cotter keys 70 and 72. It is to be noted that the wheel 40 has a sleeve 73 welded thereto and that the cotter key 70 passes through the sleeve 73 as well as through the axle 60 so that rotation of the axle 60 effects rotation of the wheel 40. Rotation of the axle 60 is effected by a drive means to be described, rotation of the wheel 40 resulting in forward movement of the velocipede 20.

The rear axle 60 is provided with a centrally located offset crank portion 80 having a sleeve bearing 82 thereabout to facilitate connection of a drive assembly, as will be described. The sleeve 82 is freely rotatable about the crank portion 80 of the axle and functions as a bearing for the drive assembly.

A pair of front wheels 100 and 102 are supported by a transverse axle 104 and are freely rotatable with respect thereto. The wheels 100 and 102 are retained on the outer end portions 106 and 108 of the axle 104 as by a pair of cotter pins 110 and 112, respectively. The axle 104 is supported by an inverted generally U-shaped yoke 114 having downwardly depending leg portions 116 and 118 (FIG. 4) with suitable apertures 120 and 122 therein, respectively, for the acceptance and support of the axle 104. An upwardly and rearwardly extending brace 124 is secured to the axle 104 as by a machine screw 126 and to the base 24 of the body 22 as by a bolt 128.

As best seen in FIG. 3, a bight portion 130 of the yoke 114 is supported for rotation about a vertical axis and with respect to the body portion 22 of the velocipede 20 by a vertically disposed pin 132. The pin 132 extends through a central aperture 134 in a spacer cup 136 that is secured to the base portion 24 of the pan 22 as by a pair of bolts 138 and 140. The pin 132 extends downwardly through complementary apertures 142 in a handle yoke brace 144 and through complementary apertures in a pair of foot supports 150 and 152 thence through an aperture 154 in the bight portion 130 of the yoke 114. It is to be noted that a sleeve 151 is disposed about the pin 132 to act as a spacer between the spacer cup 136 and bight portion 130 of the yoke 114 to accommodate the foot supports 150 and 152 and to minimize friction between the relatively movable components.

The foot supports 150 and 152 are rotatable about the pin 132 from a retracted or inwardly held position (FIG. 2) to a transverse position (FIG 12). The foot supports 150 and 152 are retained in the retracted position as by a spring retainer clip 160 (FIG. 8) that is secured to the downwardly extending axle brace 124 as by a pair of rivets 161. The retainer clip 160 has resilient end portions 162 and 164 for the engagement of downwardly depending flanges 166 and 168 on the foot supports 150 and 152, respectively.

As best seem in FIGS. 2 and 4, a forwardly extending and generally U-shaped handle support yoke 200, having leg portions 202 and 204 with suitable apertures 206 and 208 for the acceptance of the front axle 104, is supported by the axle 104 and by the forwardly extending bracket 144. The yoke 200 has a generally U-shaped center portion defined by a pair of folded legs 212 and 214 (FIG. 2) and a bight portion 216. The bracket 144 is journaled about the downwardly extending pivot pin 132 and has a forward end portion 217 secured to the bight portion 216 of the yoke 200, as by a bolt 218 thereby to support the yoke 200 against rotation about the axle 104. Thus, it will be seen that the yoke 200 is triangularly supported with respect to the axle 104 by engagement of the end portions 202 and 204 thereof with the axle 104 in combination with the engagement of the end portion 217 of the bracket 144 with the bight portion 216 of the yoke 200. However, the yoke 114 and axle 104 are freely rotatable about the pivot pin 132 to effect steerage of the velocipede 20.

In acordance with the present invention, a handle 250 having a handle grip 252 at one end 254 thereof and a tongue member 260 secured to the other end 262 thereof functions as a steering mechanism for the velocipede 20 in one condition and as a propelling mechanism in an alternate condition.

As best seen in FIG. 6, the tongue 260 is secured to the lower end portion 262 of the handle 250 as by a pin 270. The tongue 260 and lower end 262 of the handle 250 have complementary arcuate cutouts 272 and 274, respectively (FIG. 10) for the acceptance of and locking engagement with a transverse pin 276 that extends parallel to the bight portion 216 of the yoke 200 through the depending leg portions 212 and 214 thereof (FIGS. 2 and 6). When the tongue 260 is in the folded position with respect to the handle 250 (FIG. 1) the cutouts 272 and 274 engage the transverse pin 276 to position and retain the handle 250 and tongue 260 with respect to the yoke 200. In this condition the handle 250 functions in the conventional manner for pulling and/or steering the velocipede 20.

The tongue 260 is retained in the folded position with respect to the handle 250 by a spring clip 280 (FIG. 9) that is secured to an upper end portion 282 of the tongue 260 as by a rivet 284. It is to be noted that the upper end portion 282 of the tongue 260 is provided with a reentrantly folded hook portion 290 that is engageable about the sleeve 82 on the crank 80 of the axle 60 to effect drive of the velocipede 20, in a manner to be described. Also, the lower end 262 of the handle 250 has a hook 292 (FIGS. 1 and 10) for engagement with a complementary sleeve 312 that is supported by a pin 313 extending transversely of a hanger 300 on the body 22 of the velocipede 20.

As best seen in FIGS. 2 and 12, the hanger 300 is secured centrally of the body portion 22 of the velocipede 20 as by a plurality of screws 302. The hanger 300 is disposed adjacent a cutout portion 304 in the base 24 of the body 22, the handle 250 being adapted to extend through the cutout 304.

As best seen in FIGS. 11, 14 and 15, the hanger 300 is of U-shaped horizontal cross sectional configuration defined by a bight portion 306 and leg portions 308 and 310. The handle support pin 313 extends through suitable apertures 314 and 316 in the leg portions 308 and 310, respectively, for the support of the sleeve 312 about which the complementary hook portion 292 of the handle 250 is disposed when the handle 250 is positioned with respect to the pan 22 of the velocipede 20 for reciprocating movement.

As best seen in FIGS. 14 and 15, the hanger 300 and the lower end portion 262 cooperate in a novel manner to insure that the handle 250 does not become disengaged from the hanger 300 upon pumping of the handle. Positive engagement is accomplished by a pair of cam faces 320 and 322 on the legs 308 and 310 of the hanger 300, respectively in cooperation with a pair of transversely extending locking ears 324 and 326 on the lower end portion 262 of the handle 250.

As best seen in FIG. 14, the ears 324 and 326 are spaced sufficiently far from the hook 292 so that the sleeve 312 and pin 313 are accepted therebetween for assembly purposes. Assembly is facilitated by a pair of flats 328 and 330 on the legs 308 and 310, respectively, that extend radially from the central axis of the apertures 314 and 316 therein, the flats 328 and 330 allowing the ears 324 and 326 to be moved radially into proximate relation to the sleeve 312 to facilitate passage of an end portion 332 of the hook 292 around the sleeve 312 to the position of FIG. 14. Engagement of the handle 250 with the hanger 300 is then completed by moving the hook 292 radially toward the sleeve 312, the flats 328 and 320 guiding the ears 324 and 326. After the hook 292 is engaged about the sleeve 312 the handle 250 may be rotated to the position of FIG. 15, it being noted that, upon rotation of the handle 250 through its normal pumping arc, the ears 324 and 326 prevent movement of the handle 250 towards the pin 313 due to engagement of the ears 324 and 326 with the arcuate cam faces 320 and 326, respetcively.

The velocipede 20 is conditioned for use as a coaster wagon by rotating the foot supports 150 and 152 inwardly of the body portion 22 and engaging the flanges 166 and 168 thereof with the complementary spring flanges 162 and 164, respectively, on the spring clip 160.

The tongue 260 of the handle 250 is inserted between the pin 276 and the bight portion 216 of the handle support yoke 200 and drawn downwardly until the arcuate cutouts 272 in the lower end portion 262 of the handle 250 engage the pin 276. The tongue 260 is then folded counterclockwise, as seen in FIGURE 1 of the drawings, and the spring clip 280 on the upper end 282 thereof engaged about the handle 250. The velocipede 20 is now conditioned for use as a coaster wagon, the handle 250 being usable to steer the wagon from a position within the body 22 or to pull the wagon.

The velocipede 20 is conditioned for use as a self-propelled "Irish Mail" by disengaging the clip 280 from the handle 250, folding the tongue 260 clockwise about the pin 276 to disengage the cutouts 274 therefrom, and retracting the handle 250 and tongue 260 upwardly from between the pin 276 and the bight portion 216 of the handle support yoke 200. The handle 250 and tongue 260 are then rotated approximately 90 degrees and inserted through the aperture 304 in the base 24 of the body 22. After passage of the ears 324 and 326 on the lower end portion 262 of the handle 250 through the aperture 304 the handle is rotated again approximately 90 degrees and the hook portions 292 and ears 324 and 326 thereof are orientated in the position shown in FIG. 14. The hook portion 292 is then moved radially towards the pin 313 and sleeve 312 until engaged thereabout. It is to be noted that, as best seen by comparing FIGS. 1 and 10, the handle 250 is now inverted from the steering and pulling condition, conditioning the hook portion 290 of the tongue 260 for engagement about the sleeve 82 on the crank 80 of the axle 60 (FIG. 13). The foot supports 150 and 152 are rotated to the outboard condition (FIG. 12) whereupon the velocipede 20 is conditioned for self-propulsion by reciprocation of the handle 250 forwardly and rearwardly of the body 22 thereby to effect rotation of the crank 80 and axle 60 and drive of the rear wheel 40. Steering is effected by pushing on the foot supports 150 and 152, the front axle and its supporting yoke 114 being rotatable as before about the pin 132.

From the foregoing description, it should be apparent that the velocipede 20 of the present invention is relatively easily converted from a coaster wagon to an "Irish Mail" capable of self-propulsion. The disposition of the reciprocable handle with respect to the body portion of the velocipede 20, when the velocipede 20 is conditioned for self-propulsion, renders the handle 250 relatively easy to pump. It is also to be noted that the velocipede 20 is conditioned for use in either of the two manners without requiring the use of tools, the handle and foot supports being held in operative relation in each condition by spring clips. The velocipede 20 is a self-contained unit not requiring removable parts that are subject to loss.

It is to be understood that the specific construction of the improved velocipede herein disclosed and described is presented for the purpose of explanation and illustration and is not intended to indicate limits of the invention, the scope of which is defined by the following claims.

What is claimed is:

1. A velocipede capable of conversion between a coaster wagon and a self-propelled wagon, said velocipede comprising a body having a pivotally mounted downwardly extending axle yoke for the support of a steerable front axle, a pair of front wheels on said front axle, a handle yoke extending forwardly of and supported by said axle so as to be pivotable therewith, a first pin on said handle yoke for supporting a handle, said body having a fixedly mounted downwardly extending rear axle yoke for the support of a rear axle including a crank, a pair of rear wheels on said rear axle at least one of which is drivably secured to said rear axle, a second pin on said body between said front and rear axles for pivotally supporting a handle, and a handle having a grip at one end and a foldable tongue pivotally connected to the other end, the tongue of said handle having means for engaging an intermediate portion of said handle to retain the tongue in the folded condition, said handle having means engageable with said first pin to condition said velocipede for use as a coaster wagon and means engageable with said second pin to condition said velocipede for use as a self-propelled wagon, the tongue of said handle having means engageable with the crank on said rear axle in said last-mentioned condition whereby movement of said handle about said second pin effects rotation of said rear axle and drive of said velocipede.

2. A velocipede having means for conversion between a coaster wagon and a self-propelled wagon, said velocipede comprising a wagon body, a downwardly extending axle yoke mounted for rotation about a vertically extending pivot pin, a front axle on said yoke for the support of a pair of front wheels, a handle yoke extending forwardly of and pivotable with said yoke and axle about the axis of said pivot pin, a first horizontally extending pin on said handle yoke for supporting a handle, said body having a fixedly mounted downwardly extending rear axle yoke for the support of a rear axle including a crank, a pair of rear wheels on said rear axle at least one of which is drivably secured to said rear axle, a second horizontally extending pin on said body between said front and rear axles for pivotally supporting a handle, a handle having a grip at one end and a foldable tongue pivotally connected to the other end, the tongue of said handle having a spring clip at the end thereof for engaging an intermediate portion of said handle to retain the tongue in the folded condition, said handle having first detent means engageable with one side of said first pin and said tongue having second detent means engageable with the other side of said first pin when the spring clip thereof is engaged with said handle to condition said velocipede for use as a coaster wagon, and means on said handle engageable with said second pin to condition said velocipede for use as a self-propelled wagon, the tongue of said handle having means engageable with the crank on said rear axle in said last-mentioned condition whereby movement of said handle about said second pin effects rotation of said rear axle and drive of said velocipede.

3. A velocipede having provision for conversion from a coaster wagon to a self-propelled wagon, said velocipede comprising a body having a pivotally mounted front axle with a pair of front wheels thereon, first means pivotable with said front axle for supporting a handle, said body having a rear axle including a crank and a pair of rear wheels at least one of which is drivably secured to said rear axle, said body having an aperture between said front and rear axles, a hanger adjacent the aperture in said body having a transverse pin for pivotally supporting a handle and a pair of spaced cam faces, and a handle having first means engageable with said first handle supporting means and second means engageable about the pin on said hanger, selectively, to condition said velocipede for use as a coaster wagon and for self-propulsion, respectively, said handle having a pair of ears thereon engageable with the cam faces on said hanger to preclude disengagement of said second means on said handle from said pin upon rotation of said handle about said pin.

References Cited in the file of this patent
UNITED STATES PATENTS

| | | |
|---|---|---|
| 858,223 | Sherry | June 25, 1907 |
| 858,224 | Sherry | June 25, 1907 |
| 1,031,475 | Sherry | July 2, 1912 |
| 1,550,479 | Wiora | Aug. 18, 1925 |
| 2,015,726 | Pasin | Oct. 1, 1935 |